Dec. 18, 1934.  W. R. GRISWOLD  1,984,577
INTERNAL COMBUSTION ENGINE
Original Filed Nov. 23, 1931
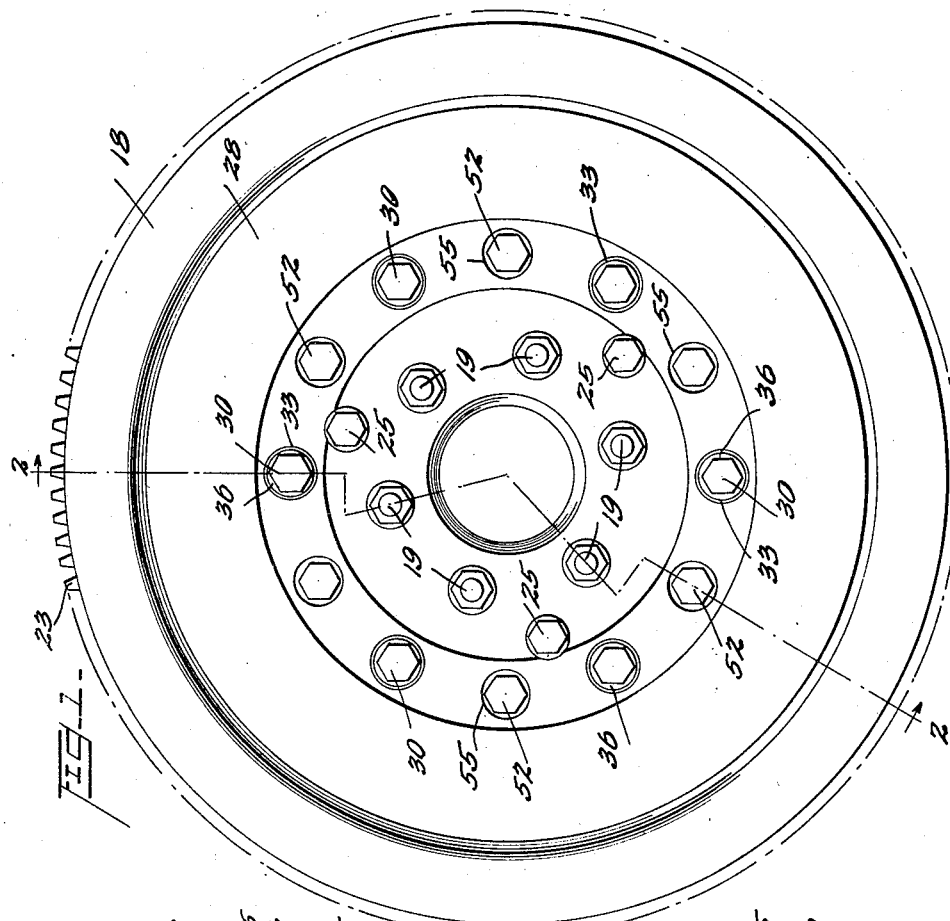
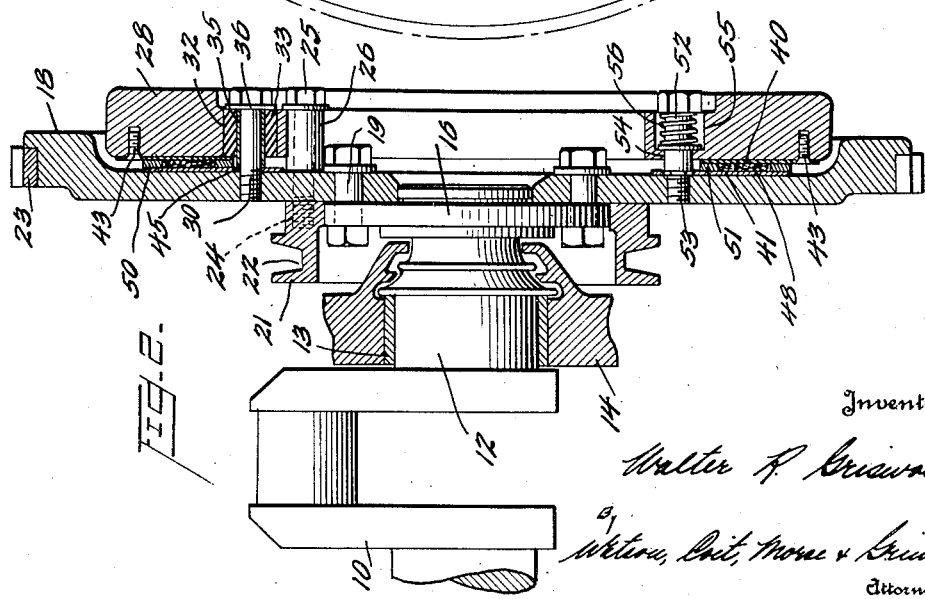
Inventor
Walter R. Griswold Patented Dec. 18, 1934

1,984,577

UNITED STATES PATENT OFFICE 1,984,577

INTERNAL COMBUSTION ENGINE

Walter R. Griswold, Detroit, Mich., assignor to Packard Motor Car Company, Detroit, Mich., a corporation of Michigan Application November 23, 1931, Serial No. 576,884
Renewed May 10, 1934

14 Claims. (Cl. 74—574)

This invention relates to internal combustion engines and has for its object the provision of means for damping torsional vibrations induced in the engine crankshaft as the result of the periodic torque impulses applied thereto.

The vibration damper disclosed herein is particularly suited for use with marine engines and is preferably associated with the relatively large flywheel ordinarily provided on such engines and forms in effect a part of the flywheel. It will nevertheless be understood that the invention has various uses and applications other than that specifically described herein.

It is a feature of the invention that the various component parts of the damper may be separately and cheaply constructed and readily assembled and that the damper may be applied to crankshafts and flywheels of conventional design without alteration thereof.

It is a further object of the invention to provide a vibration damper of the type employing relatively movable frictionally connected members in which the cooperating friction surfaces of these members are completely protected from water, oil, or other foreign matter.

Further objects and features of the invention will be apparent from the following description taken in connection with the accompanying drawing, in which Figure 1 is an elevational view of a combined flywheel and vibration damper embodying the principles of the invention; and Figure 2 is a sectional view taken substantially on the line 2—2 of Figure 1.

Referring more specifically to the drawing, the reference numeral 10 designates a crankshaft having bearing portions 12 mounted in suitable bearings 13 carried in the crank case 14. Secured to or formed integrally with the forward end of the shaft 12 is an annular flange 16 and a flywheel 18 is secured to this flange by bolts 19 passing through the flange and flywheel. A pulley 21 having a belt receiving grooved periphery 22 may be secured to the flywheel by cap screws 24 threaded in the pulley and passing through the flywheel, the heads 25 of these screws being spaced from the face of the flywheel by means of sleeves 26 to render the screws readily accessible. A ring gear 23 may be shrunk on the periphery of the flywheel for engagement by conventional apparatus for starting the motor.

Inertia means 28, preferably consisting of an annular member having considerable mass, is mounted on the flywheel adjacent the outer face thereof. When vibrations are induced in the shaft, the inertia member 28 partakes of vibratory movement with relation to the shaft and flywheel and for this purpose is secured to the flywheel by means of a plurality of circumferentially disposed bolts 30 threaded into the flywheel and extending through apertures 32 in the inertia member. Bushings 33 of deformable material, for instance rubber, are inserted in the apertures 32 and surround the bolts 30, spacing sleeves 35 and washers 36 being provided to limit the extent to which the bolts 30 are threaded into the flywheel. If desired the separate bushings 33 may be replaced by a single annular member of deformable material having bosses formed thereon and projecting into the apertures 32 in the inertia member 28 as described in my copending application Serial No. 430,208, filed February 21, 1930.

It will be seen that by the arrangement thus far described the necessary relative movement of the inertia member 28 and flywheel 18 may take place, the energy of this relative movement being absorbed to some extent by internal friction in the deformable bushings 33, these bushings being alternately compressed and expanded by the relative motion of the inertia member and flywheel. It is found in practice, however, that vibration dampers having a large mass require additional means for absorbing the energy of vibration. In the present arrangement this means comprises a mechanical friction device consisting of annular plates 40 and 41, the plate 40 being adapted to be secured to the inertia member by screws 43 and the plate 41 being provided with apertures 45 through which the cap screws 30 may pass, the sleeves 35 engaging the plate 41 to clamp the same against the face of the flywheel 18 as shown in Figure 1 of the drawing.

An annular disc 48 of suitable friction developing material, for instance an asbestos compound impervious to moisture, is interposed between the plates 40 and 41 and is retained in position by annular rings 50 and 51, preferably of rubber, each ring being vulcanized to both plates.

It will be observed that the friction device just described constitutes a unitary assembly which may be formed separately and applied to the flywheel and inertia member as a unit, the rings 50 and 51 serving to prevent access of water and oil to the friction disc 48 so that the efficiency of the cooperating friction members cannot be impaired by rust or by the presence of lubricant.

In order to increase the amount of friction developed by the friction device just described, a plurality of bolts 52 are threaded into the flywheel at 53, these bolts passing through apertures 54 in the inertia member 28. Coil springs 56 surrounding the bolts 52 are placed under compression between the heads of the bolts and the inertia member, recesses 55 being provided in the latter to accommodate the springs. In the arrangement shown in the drawing the bolts 30 and 52 are located at equal distances from the shaft axis and are alternately arranged.

The arrangement herein is found to be extremely practical and to involve a minimum of expense in construction and assembly. A very simple form of mould may be used in forming the rubber bushings 33 and an equally simple die will suffice for vulcanizing the ring members 50 and 51 to the plate members 40 and 41. By reason of the protection afforded the friction disc 48 and the cooperating faces of the plates 40 and 41, replacement of the friction developing device will be seldom required and if replacement is necessary the entire device may be readily removed and a new unit substituted.

The embodiment of the invention disclosed herein has been described specifically in order to facilitate an understanding of the principles of the invention, but it will be understood that no limitation of the scope of the invention is intended thereby and that various changes and alterations may be made without departing from the spirit of the invention.

Having thus described the invention, what is claimed as new and desired to be secured by Letters Patent is:

1. In a vibration damper for crankshafts, the combination with a flywheel member adapted to be secured to the shaft, of an inertia member mounted on said flywheel member for movement with respect thereto, one of said members having apertures therethrough, deformable bushings fitting within said apertures, bolts passing through said bushings and threaded in the other of said members, and friction means interposed between said members, said friction means comprising a pair of annular plates, one secured to each of said members, an annular disc of friction material interposed between said plates, and rubber rings within and surrounding said disc and vulcanized to said plates to exclude moisture from the cooperating surfaces of said plates and said disc.

2. In a vibration damper for crankshafts, the combination with a flywheel adapted to be secured to the shaft, of inertia means mounted on said flywheel for movement with respect thereto in response to shaft vibration, and friction means interposed between said members, said friction means comprising a pair of annular plates, one secured to each of said members, an annular disc of friction material interposed between said plates, and rubber rings within and surrounding said disc and vulcanized to said plates to exclude moisture from the cooperating surfaces of said plates and said disc.

3. In a vibration damper for crankshafts, the combination with a member mounted for rotation with the shaft, of an inertia member mounted for movement with respect to the shaft, friction means acting between said members to dissipate the energy of shaft vibration, said friction means comprising a pair of annular plates, one secured to each of said members, an annular disc of friction material interposed between said plates, and rubber rings within and surrounding said disc and vulcanized to said plates to exclude moisture from the cooperating surfaces of said plates and said disc.

4. In a vibration damper for crankshafts, the combination with a member mounted for rotation with the shaft, of an inertia member mounted for movement with respect to the shaft, a pair of annular plates, one secured to each of said members, friction means interposed between and engaging said plates, and rubber rings within and surrounding said friction means and adhering to said plates to exclude moisture from the cooperating surfaces of said plates and said disc.

5. In a vibration damper for crankshafts, the combination with members supported for relative movement about the crankshaft axis in response to torsional vibration induced in the shaft, said members having opposed, axially spaced surfaces, of friction means interposed between and frictionally engaging said surfaces, and annular elements of material impervious to moisture within and surrounding said friction means, positioned between and adhering to said surfaces, to exclude moisture from said friction means and the cooperating portions of said surfaces.

6. In a vibration damper for crankshafts, the combination with members supported for relative movement about the crankshaft axis in response to torsional vibration induced in the shaft, said members having opposed, axially spaced annular surfaces, of annular friction means interposed between and frictionally engaging said surfaces, and annular elements of material impervious to moisture within and surrounding said friction means, positioned between and adhering to said surfaces, to exclude moisture from said friction means and the cooperating portions of said surfaces.

7. In a vibration damper for crankshafts, the combination with a member mounted for rotation with the shaft, of an inertia member mounted for movement with respect to the shaft, friction means acting between said members to dissipate the energy of shaft vibration, said friction means comprising a pair of annular plates, one secured to each of said members, an annular disc of friction material interposed between said plates, and a rubber ring surrounding said disc and interposed between said plates.

8. In a vibration damper for crankshafts, the combination with a member mounted for rotation with the shaft, of an inertia member mounted for movement with respect to the shaft, said members having opposed operative friction developing faces, a member of friction material interposed between said faces and cooperating therewith to develop friction, and moisture excluding means interposed between said faces and enclosing said last mentioned member, said moisture excluding means being composed of elastic deformable material surface bonded to said faces.

9. In a vibration damper for crankshafts, the combination with a member mounted for rotation with the shaft, of an inertia member mounted for movement with respect to the shaft, said members having opposed operative friction developing faces, a member of friction material interposed between said faces and cooperating therewith to develop friction, and moisture excluding means interposed between said faces and enclosing said member, said moisture excluding means being composed of rubber and being vulcanized to the faces.

10. In a vibration damper for crankshafts, the combination with a member mounted for rotation with the shaft, of an inertia member mounted for movement with respect to the shaft, said members having opposed annular friction developing faces, an annular disc of friction material interposed between said faces and cooperating therewith to develop friction, and annular moisture excluding elements interposed between said faces within and surrounding said disc, said moisture excluding elements being composed of elastic deformable material surface bonded to said faces.

11. In a vibration damper for crankshafts, the combination with a member mounted for rotation with the shaft, of an inertia member mounted for movement with respect to the shaft, said members having opposed annular friction developing faces, an annular disc of friction material interposed between said faces and cooperating therewith to develop friction, and annular moisture excluding elements interposed between said faces within and surrounding said disc, said moisture excluding elements being composed of rubber and being vulcanized to the faces.

12. In a vibration damper for crankshafts, the combination with a member mounted for rotation with the shaft, of an inertia member mounted for movement with respect to the shaft, said members having substantially flat opposed operative friction developing faces, a member of friction material interposed between said faces and cooperating therewith to develop friction, and moisture excluding means interposed between said faces and enclosing said last mentioned member.

13. A friction developing unit for use in vibration dampers comprising a pair of annular plates having opposed friction developing faces and adapted to be respectively secured to the relatively movable parts of the damper, a member of friction material interposed between said faces and cooperating therewith to develop friction, and moisture excluding means interposed between said faces and enclosing said member.

14. A friction developing unit for use in vibration dampers comprising a pair of annular plates having opposed friction developing faces and adapted to be respectively secured to the relatively movable parts of the damper, a member of friction material interposed between said faces and cooperating therewith to develop friction, and moisture excluding means interposed between said faces and enclosing said member, said moisture excluding means being composed of elastic deformable material surface bonded to said faces.

WALTER R. GRISWOLD.